US012732396B2

(12) United States Patent
Goswami et al.

(10) Patent No.: US 12,732,396 B2
(45) Date of Patent: Sep. 8, 2026

(54) DISTRIBUTED NETWORK STACK USING AN OVERLAY NETWORK

(71) Applicant: Boost SubscriberCo L.L.C., Englewood, CO (US)

(72) Inventors: Sundeep Goswami, Leesburg, VA (US); Ash Khamas, Goffstown, NH (US)

(73) Assignee: Boost SubscriberCo L.L.C., Englewood, CO (US)

( * ) Notice: Subject to any disclaimer, the term of this patent is extended or adjusted under 35 U.S.C. 154(b) by 333 days.

(21) Appl. No.: 18/521,659

(22) Filed: Nov. 28, 2023

(65) Prior Publication Data

US 2024/0430132 A1 Dec. 26, 2024

Related U.S. Application Data

(60) Provisional application No. 63/522,635, filed on Jun. 22, 2023.

(51) Int. Cl.

| | |
|---|---|
| ***H04L 12/46*** | (2006.01) |
| ***H04L 45/64*** | (2022.01) |
| ***H04L 67/10*** | (2022.01) |

(52) U.S. Cl.

CPC .......... *H04L 12/4641* (2013.01); *H04L 45/64* (2013.01); *H04L 67/10* (2013.01)

(58) Field of Classification Search

CPC ...... H04L 12/4641; H04L 67/10; H04L 45/64
See application file for complete search history.

(56) References Cited

U.S. PATENT DOCUMENTS

| | | | | |
|---|---|---|---|---|
| 8,862,735 | B1 | 10/2014 | Singh et al. | |
| 10,965,737 | B1 * | 3/2021 | Parulkar | H04L 67/52 |
| 11,252,655 | B1 | 2/2022 | Gupta et al. | |
| 11,388,227 | B1 | 7/2022 | Sun et al. | |
| 11,733,901 | B1 * | 8/2023 | Potyraj | G06F 3/0607 711/154 |
| 11,838,150 | B2 | 12/2023 | Trujillo et al. | |

(Continued)

FOREIGN PATENT DOCUMENTS

WO 2020/018623 A1 1/2020

OTHER PUBLICATIONS

Sundeep Goswami, "Target Environment Agnostic Network Function Deployment Pipeline," U.S. Appl. No. 18/390,781, filed Dec. 20, 2023. (28 Pages).

(Continued)

*Primary Examiner* — Michael K Phillips
(74) *Attorney, Agent, or Firm* — Kipman T. Werking; Frontier IP Law PLLC

(57) ABSTRACT

A mobile network operator may deploy a distributed network stack including, deploying a first cloud native function in a first public cloud and deploying a second cloud native function in a second public cloud. A system may provide a connected virtual private cloud. A system may deploy one or more virtual routers within the connected virtual private cloud. A system may connect the first public cloud and the second public cloud to the connected virtual private cloud using the one or more virtual routers in the connected virtual private cloud to form the overlay network. A system may transmit data traffic between the first cloud native function and the second cloud native function using the overlay network.

20 Claims, 8 Drawing Sheets

(56) References Cited

U.S. PATENT DOCUMENTS

| | | | | |
|---|---|---|---|---|
| 12,316,540 | B1 * | 5/2025 | Delecroix | H04L 45/64 |
| 2012/0281708 | A1 * | 11/2012 | Chauhan | H04L 67/141<br>370/401 |
| 2016/0197834 | A1 * | 7/2016 | Luft | H04L 12/46<br>709/223 |
| 2017/0181210 | A1 * | 6/2017 | Nadella | H04W 48/16 |
| 2018/0248787 | A1 | 8/2018 | Rajagopal et al. | |
| 2020/0382345 | A1 * | 12/2020 | Zhao | H04L 45/50 |
| 2020/0412608 | A1 | 12/2020 | Dunbar et al. | |
| 2021/0045193 | A1 | 2/2021 | Mishra et al. | |
| 2021/0385149 | A1 | 12/2021 | Suryanarayana et al. | |
| 2022/0038554 | A1 * | 2/2022 | Merwaday | H04L 45/64 |
| 2022/0247812 | A1 | 8/2022 | Mheta et al. | |
| 2023/0100276 | A1 | 3/2023 | Basur et al. | |
| 2023/0198676 | A1 | 6/2023 | Kn et al. | |
| 2023/0239374 | A1 | 7/2023 | Balachandran | |
| 2023/0336381 | A1 | 10/2023 | Trujillo et al. | |
| 2023/0336476 | A1 | 10/2023 | Trujillo et al. | |
| 2024/0256298 | A1 | 8/2024 | Dharampurikar et al. | |
| 2024/0267356 | A1 | 8/2024 | Chopra | |

OTHER PUBLICATIONS

International Search Report and Written Opinion for PCT/US2023/018353, mailed on Oct. 19, 2023. (11 Pages).

Latif et al., "Telco Meets AWS Cloud: Deploying DISH's 5G Network in AWS Cloud," AWS for Industries, Feb. 27, 2022, Retrieved from the Internet: URL:https://aws.amazon.com/blogs/industries/telco-meets-aws-cloud-deploying-dishs-5g-network-in-aws-cloud/ (10 pages).

International Search Report and Written Opinion for PCT/US2023/018361, mailed on Oct. 19, 2023. (10 Pages).

"3rd Generation Partnership Project; Technical Specification Group Radio Access Network; NG-RAN; Architecture Description (Release 16)," 3GPP TS 38.401 VI6.8.0, Dec. 2021, 79 pages.

Dunbar et al., "Dynamic Networks to Hybrid Cloud DCs Problem Statement," Network Working Group, Internet Draft, Version 12, Mar. 7, 2022, 20 pages.

International Search Report and Written Opinion received for PCT Patent Application No. PCT/US24/29943, mailed on Aug. 2, 2024, 13 pages.

Jouin Lionel, "IT 20 044 Network Service Mesh Solving Cloud Native IMS Networking Needs", Jul. 2020, 72 pages.

* cited by examiner

DISTRIBUTED NETWORK STACK USING AN OVERLAY NETWORK

BRIEF SUMMARY

In an effort to provide wireless network services that enable faster speeds, increased bandwidth in a more a resilient and stable network, Fifth Generation (5G) wireless technology has been developed with a goal to provide a dynamic, coherent and flexible framework of multiple advanced technologies supporting a variety of applications. However, determining how best to deliver such services in a cloud-based environment with the desired end-to-end performance presents many challenges. It is with respect to these and other considerations that the embodiments described herein have been made.

5G technology provides a broad range of wireless services delivered to the end user across multiple access platforms and multi-layer networks. 5G utilizes an intelligent architecture, with Radio Access Networks (RANs) not constrained by base station proximity or complex infrastructure. 5G enables a disaggregated, flexible, and virtualized RAN with interfaces creating additional data access points.

5G network functions may be completely software-based and designed as cloud-native, meaning that they're agnostic to the underlying cloud infrastructure, allowing higher deployment, agility, and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core, transport networks, and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth, and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various legacy physical network functions such as baseband units, service gateways, subscriber authentication systems, firewalls, load balancers, and routers with virtualized instances running as software. This eliminates the need to invest in expensive hardware elements and can also accelerate installation times, thereby providing revenue-generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to accelerate the deployment of new features and technology with scale. The O-RAN ALLIANCE objective is to allow multi-vendor deployment with off-the-shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

In some aspects, the techniques described herein relate to a method for deploying network functions into target cloud computing environments in a cellular telecommunication network using an overlay network, the method including: deployment, by a mobile network operator, of a first cloud native function in a first public cloud; deployment, by the mobile network operator, of a second cloud native function in a second public cloud; providing a connected virtual private cloud; by deploying one or more virtual routers within the connected virtual private cloud; connecting the first public cloud and the second public cloud to the connected virtual private cloud using the one or more virtual routers in the connected virtual private cloud to form the overlay network; and transmitting data traffic between the first cloud native function and the second cloud native function using the overlay network.

In some aspects, the techniques described herein relate to a method, wherein the overlay network is connected to physical infrastructure of the first public cloud and the second public cloud via a colocation data center.

In some aspects, the techniques described herein relate to a method, wherein the first public cloud and the second public cloud are operated by different cloud computing cloud service providers.

In some aspects, the techniques described herein relate to a method, further including: deploying a third cloud native function in an on-prem environment; connecting the on-prem environment to the first public cloud and the second public cloud via the overlay network; and transmitting data traffic between the on-prem environment, the first cloud native function, and the second cloud native function using the overlay network.

In some aspects, the techniques described herein relate to a method, wherein the first cloud native function and the second cloud native function form part of a single network stack that is distributed between the first public cloud and the second public cloud.

In some aspects, the techniques described herein relate to a method, wherein the first public cloud and the second public cloud appear to be on a single network due to connections with the overlay network.

In some aspects, the techniques described herein relate to a method, wherein the first cloud native function is deployed to the first public cloud based on performance characteristics of the first public cloud relative to the first cloud native function.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems, networks and databases, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
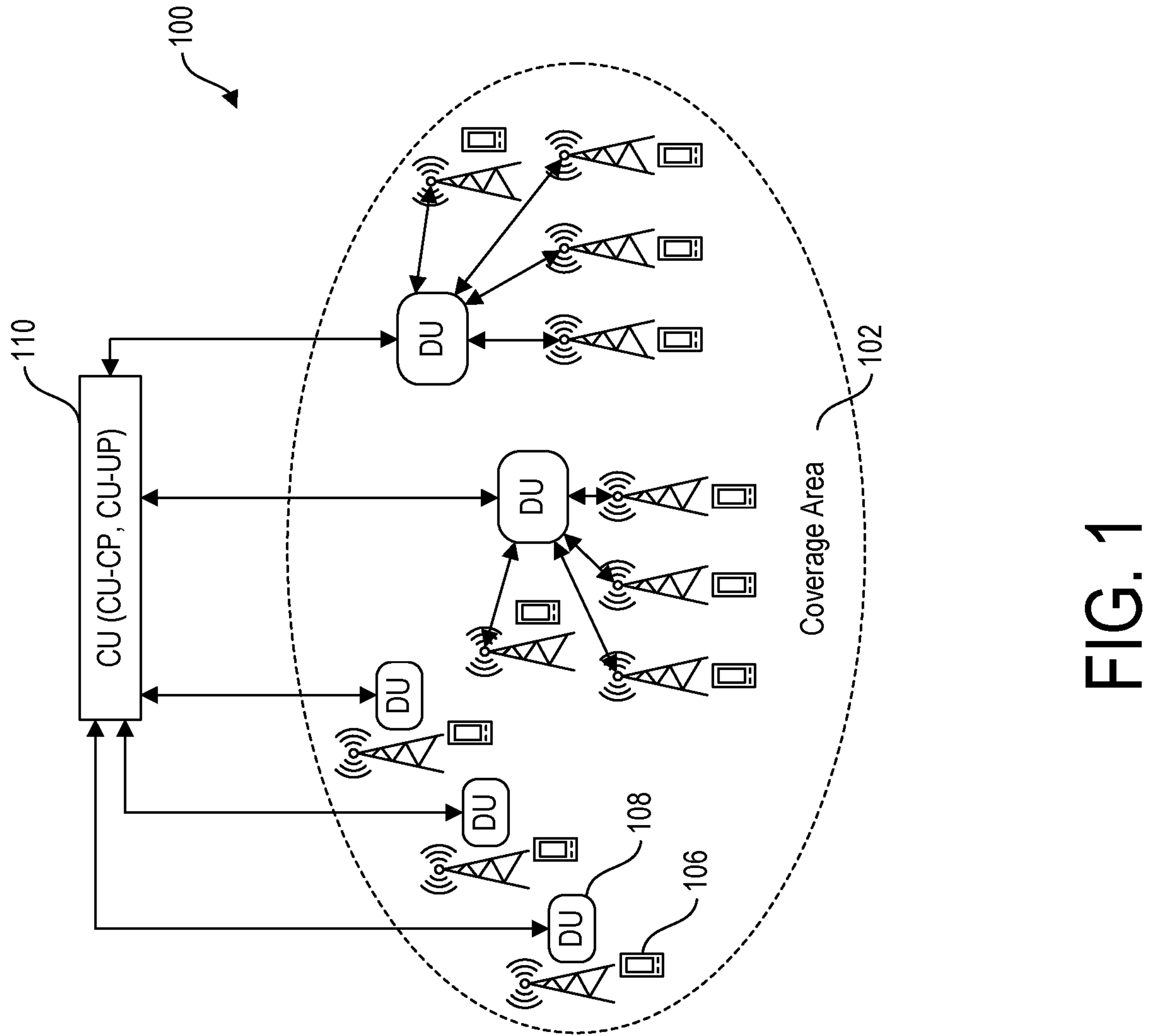
FIG. 1 illustrates a context diagram of a system that enables an overlay network to interconnect a first public cloud and second public cloud, implemented in accordance with embodiments described herein.

FIG. 1 illustrates a context diagram of a system 100 that enables an overlay network to interconnect a first public cloud and second public cloud, in accordance with embodiments described herein.

Shown is an example mobile network operator coverage area 102. Operators may configure the mobile user's device, referred to herein as user equipment (UE), such as UE 106 to operate in coverage area 102. As shown in FIG. 1, a 5G RAN is split into DUs (e.g., DU 108) that manage scheduling of all the users and a CU 110 that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
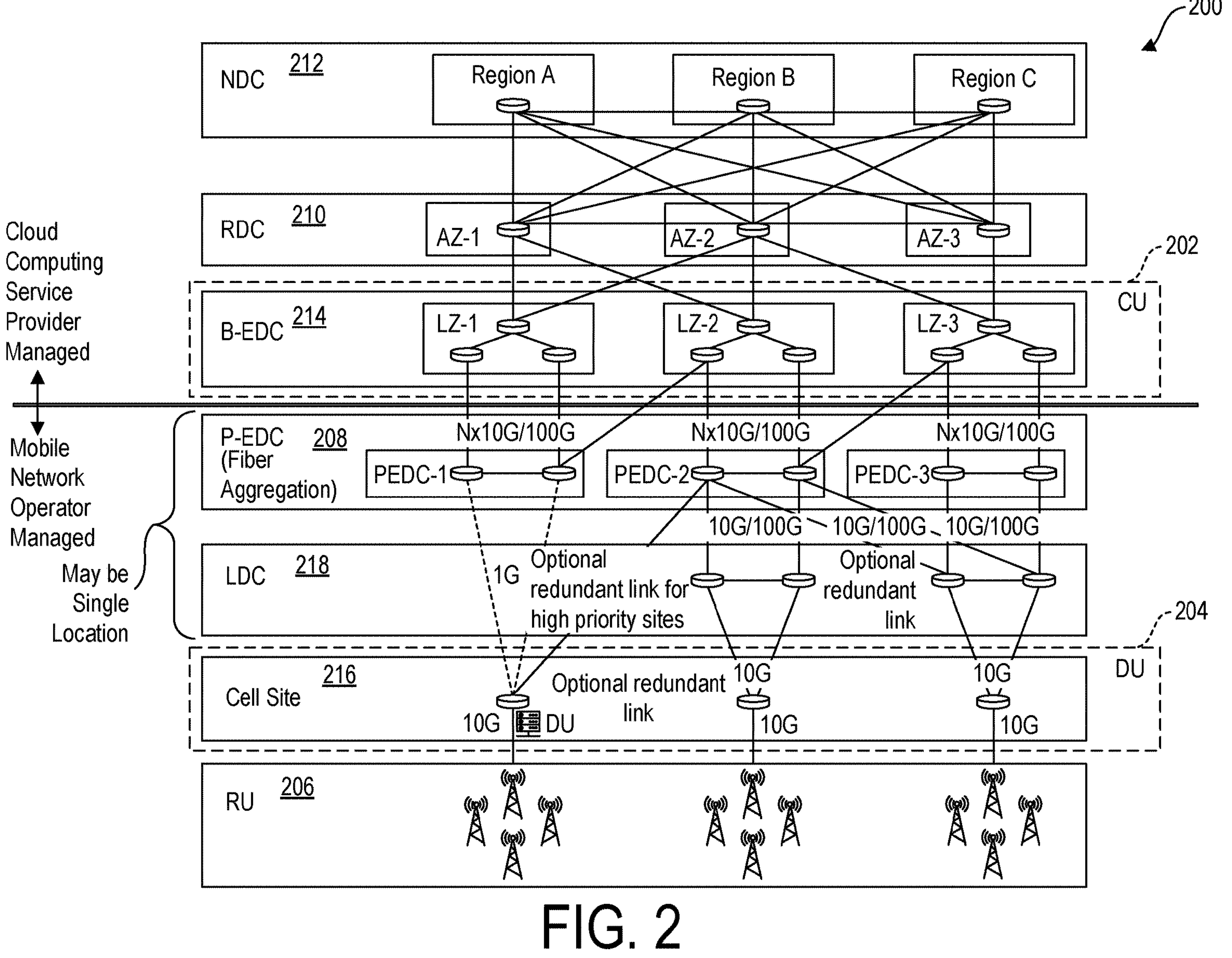
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein.

As shown in FIG. 2, the RU 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP) respectively. A CU with multiple DUs will support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in one or more edge clouds (local data center (LDC) 218 or central office) depending on transport availability and fronthaul interface. The CU's server and relevant software may be hosted in one or more clouds in one or more regional cloud data centers or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by one or more cloud computing service providers. According to various embodiments, the actual split between DU and RU may be different depending on the specific use-case and implementation.

In various embodiments, cellular telecommunication network functions, such as those described above and others, may be moved between various cloud computing service provider's cloud platforms or additional network functions may be added to cloud platforms (e.g., for cost, performance, high availability, etc.). Thus, it is advantageous to be able to deploy various network functions among cloud service providers' cloud platforms and have them appear as though they are on a single network.

Figure 3:
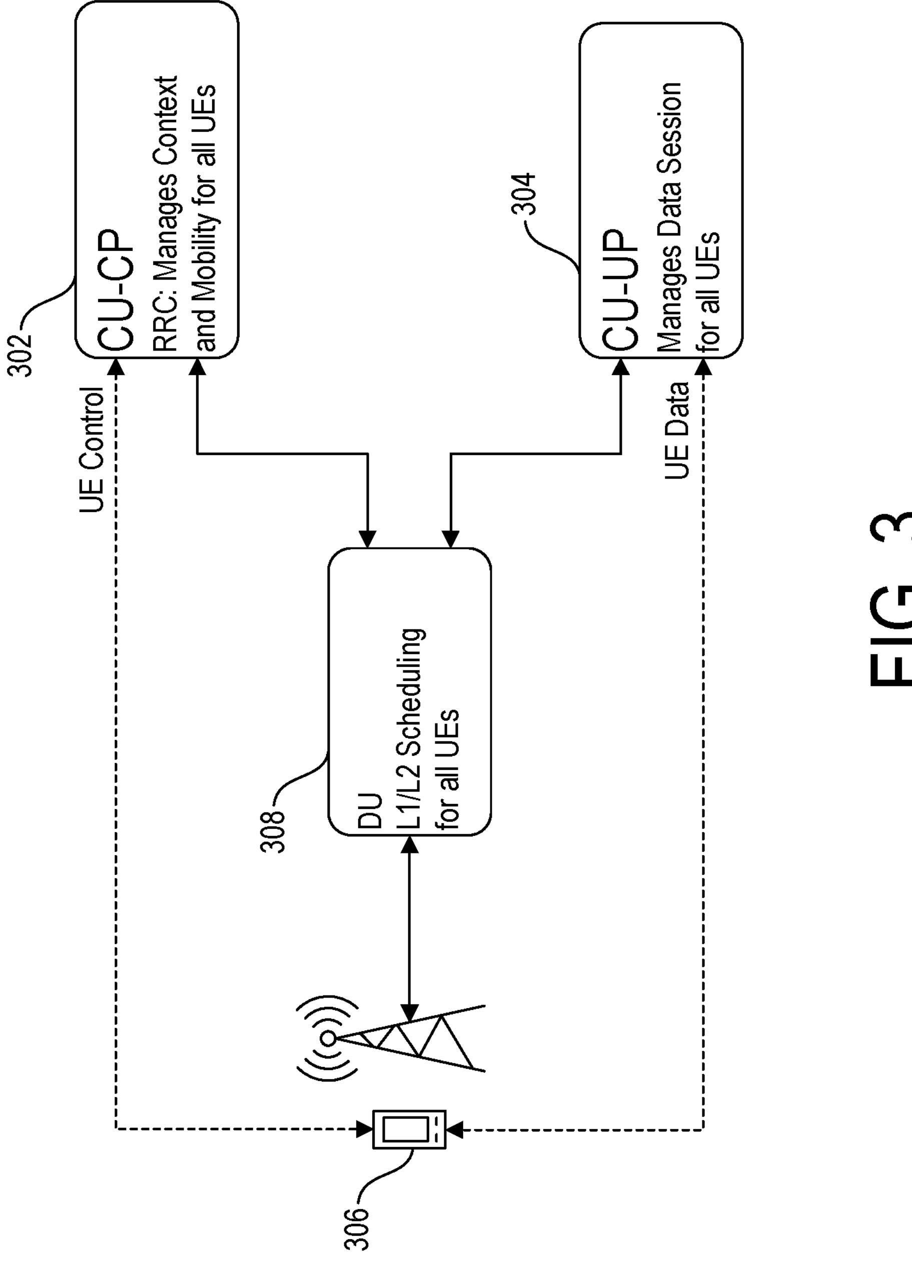
FIG. 3 illustrates a diagram showing connectivity between certain telecommunication network components during cellular communication.

FIG. 3 is a diagram showing connectivity between certain telecommunication network components during cellular communication in accordance with embodiments described herein.

The central unit control plane (CU-CP), for example the CU-CP of CU 110 of FIG. 1 or CU 202 of FIG. 2, primarily manages control processing of DUs, such as DU 308, and UEs, such as UE 306. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU-CP 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

Figure 4:
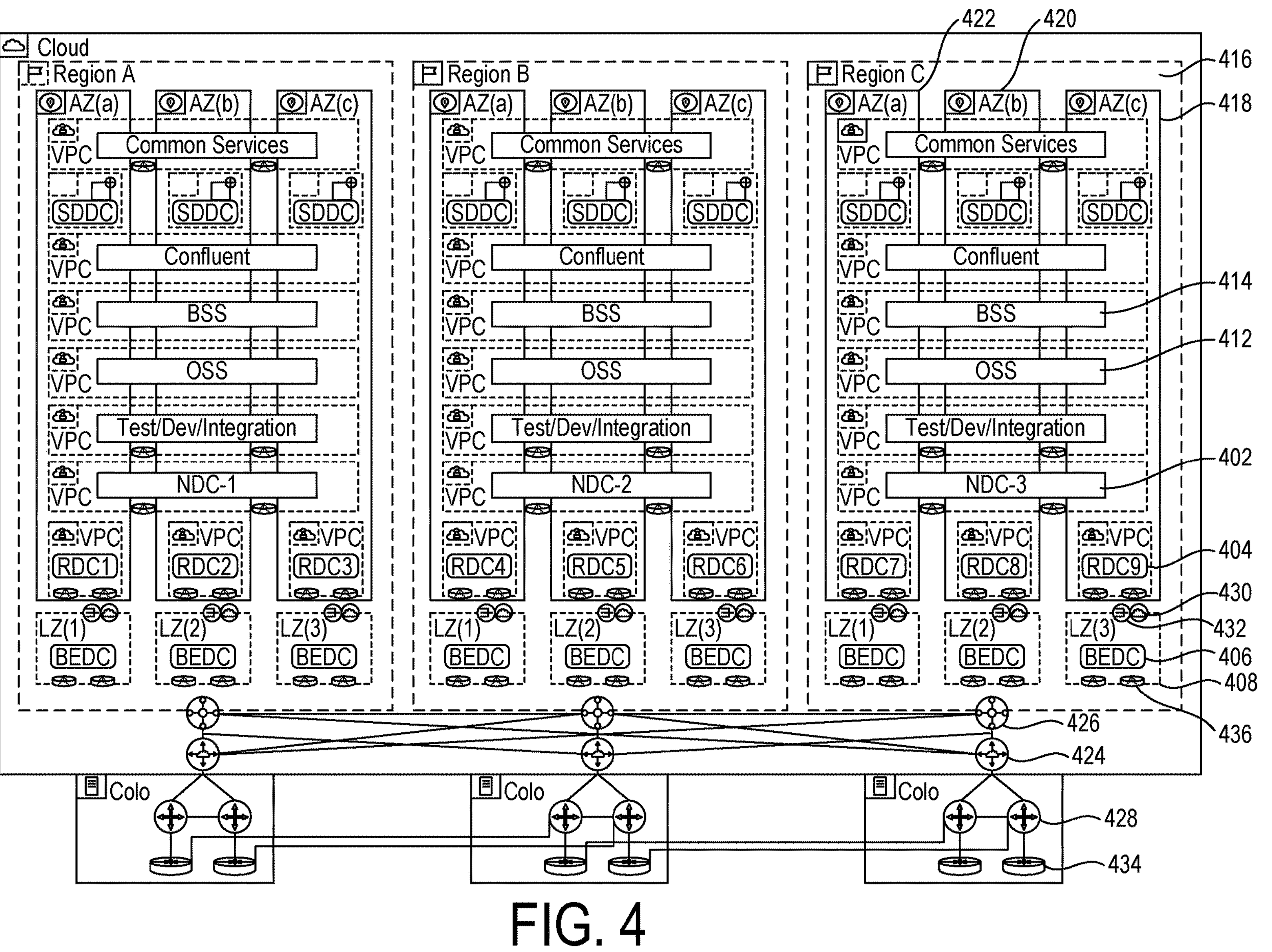
FIG. 4 illustrates a diagram of networking underlay with a Virtual Private Cloud design in a system that enables an overlay network to interconnect a first public cloud and second public cloud.

Referring now to FIG. 4, a networking architecture is shown for a Virtual Private Cloud (VPC) design in a system that enables an overlay network to interconnect a first public cloud and second public cloud. An underlay network is the cloud provider network responsible for the delivery of packets such as IP packets. A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user.

FIG. 4 displays one embodiment of VPCs used by the system that enables an overlay network to interconnect a first public cloud and second public cloud. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), such as NDC 402, Regional Data Centers (RDCs), such as RDC 404, and Breakout Edge Data Centers (BEDCs), such as BEDC 406, as shown in FIG. 4, to accommodate the distributed nature of 5G functions and the varying requirements for service layer integration. BEDCs are deployed in Local Zones, such as LZ 408, hosting 5G NFs that have strict latency budgets. They are connected with Passthrough Edge Data Centers (PEDC), which serve as an aggregation point for all Local Data Centers (LDCs) and cell sites in a particular market. BEDCs also provide internet peering for 5G data service.

In the embodiment shown in FIG. 4, the NDCs host a nationwide global service such as an OSS (Operating Support System) 412 and BSS (Billing Support System) 414. An NDC 402 is hosted in a Region 416 and spans multiple availability zones (AZ), such as AZ 418, 420, and 422, for high availability. For geographical diversity, in some embodiments, NDCs are mapped to regions where three NDCs are built in three U.S. regions (Region A, Region B, and Region C). An NDC is built to span across at least two AZs for high availability. Also shown in the network architecture displayed in FIG. 4 are DirectConnect Gateways (DXGWs), such as DXGW 424, Transit Gateways (TGWs), such as TGW 426, DirectConnect Routers, such as DirectConnect Router 428, Internet Gateways, such as Internet Gateway 430, NAT Gateways, such as NAT Gateway 432, system routers, such as system router 434, and virtual routers, such as virtual router 436.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone (LZ). These combined pieces provide a full RAN solution that handles all radio level control and subscriber data traffic.

In some embodiments, the User Plane Function is collocated in the BEDC, which anchors user data sessions and routes traffic to the internet. In another aspect, the BEDCs leverage local internet access available in LZs, which allows for a better user experience while optimizing network transport utilization.

In one or more embodiments, the Regional Data Centers (RDCs) are hosted in the Region across multiple availability zones. The RDCs host 5G subscribers' signaling processes such as authentication and session management as well as voice services for 5G subscribers. These workloads can operate with relatively high latencies, which allows for a centralized deployment throughout a region, resulting in cost efficiency and resiliency. For high availability, three RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilize a high-speed backbone to failover between AZs for application resiliency. CNFs like Access and Mobility Management Function (AMF) and Session Management Functions (SMF), which are deployed in RDC, continue to be accessible from the BEDC in the Local Zone in case of an AZ failure. They serve as the backup CNF in the neighboring AZ and would take over and service the requests from the BEDC.

In this embodiment of a system that enables an overlay network to interconnect a first public cloud and second public cloud, dedicated VPCs are implemented for each Data Center type (e.g., local data center, breakout edge data center, regional data center, national data center, and the like). In some such embodiments, the national data center VPC stretches across multiple AZs. In another aspect of some embodiments, two or more AZs are implemented per region of the cloud computing service provider.

In still another aspect of some embodiments of the system architecture, the regional data center VPCs are confined into a single AZ per region. In yet another aspect, the breakout edge data center includes two or more VPCs. These two or more VPCs may include Direct Connect (DX) Virtual Private Clouds and Internet Virtual Private Clouds.

In one aspect of some embodiments, the system architecture includes one dedicated Virtual Private Cloud per region. Software-Defined Data Center software may be implemented on the Cloud Infrastructure, which enables customers to run production applications across private cloud environments.

In still another aspect of some embodiments of the system architecture, a transit gateway (TGW) is dedicated to each environment. A transit gateway is a network transit hub that may be used to interconnect virtual private clouds (VPCs) with on-premises networks. In yet another aspect of some embodiments, the transit gateway (TGW) enables peering between regions. Such Inter-Region VPC Peering enables VPC resources like EC2 instances (e.g., virtual servers in an Elastic Compute Cloud (EC2) for running applications), Relational Database Service (RDS) databases and Lambda functions (e.g., server-less compute services that run code in response to events and automatically manage underlying compute resources) running in different regions to communicate with each other using private IP addresses, without requiring gateways, VPN connections, or separate network appliances.

A VPC peering connection is a networking connection between two VPCs that enables traffic to be routed between them using private IPv4 addresses or IPv6 addresses. Instances in either VPC can communicate with each other as if they are within the same network. A VPC peering connection may be created between different cloud provider accounts.

A cloud computing service provider uses the existing infrastructure of a VPC to create a VPC peering connection. The VPC peering connection is not a gateway or a VPN connection. Additionally, the VPC peering connection does not rely on a separate piece of physical hardware so there is no single point of failure for communication or a bandwidth bottleneck. A VPC peering connection helps facilitate the transfer of data.

A peering relationship may be established between VPCs across different Regions (also called inter-Region VPC peering). This enables VPC resources including EC2 instances, RDS databases and Lambda functions that run in different Regions to communicate with each other using private IP addresses, without requiring gateways, VPN connections, or separate network appliances.

The traffic remains in the private IP space. All inter-region traffic is encrypted with no single point of failure, or bandwidth bottleneck. Traffic always stays on the global cloud provider backbone, and never traverses the public internet, which reduces threats, such as common exploits, and DDOS attacks. Inter-Region VPC Peering provides a simple and cost-effective way to share resources between regions or replicate data for geographic redundancy.

In some embodiments of the network architecture, traffic from each virtual router is encapsulated using Generic Routing Encapsulation (GRE) tunnels, creating an Overlay Network. This leverages the underlay network for end-point reachability. The Overlay network uses Intermediate Systems to Intermediate Systems (IS-IS) routing protocol in conjunction with Segment Routing Multi-Protocol Label Switching (SR-MPLS) to distribute routing information and establish network reachability between the virtual routers. Multi-Protocol Border Gateway Protocol (MP-BGP) over GRE is used to provide reachability from on prem to Overlay network and reachability between different regions in the cloud. The combined solution provides the ability to honor requirements, such as traffic isolation and efficiently route traffic between on-prem, and 3rd parties (e.g., voice aggregators, regulatory entities, and the like).

Figure 5:
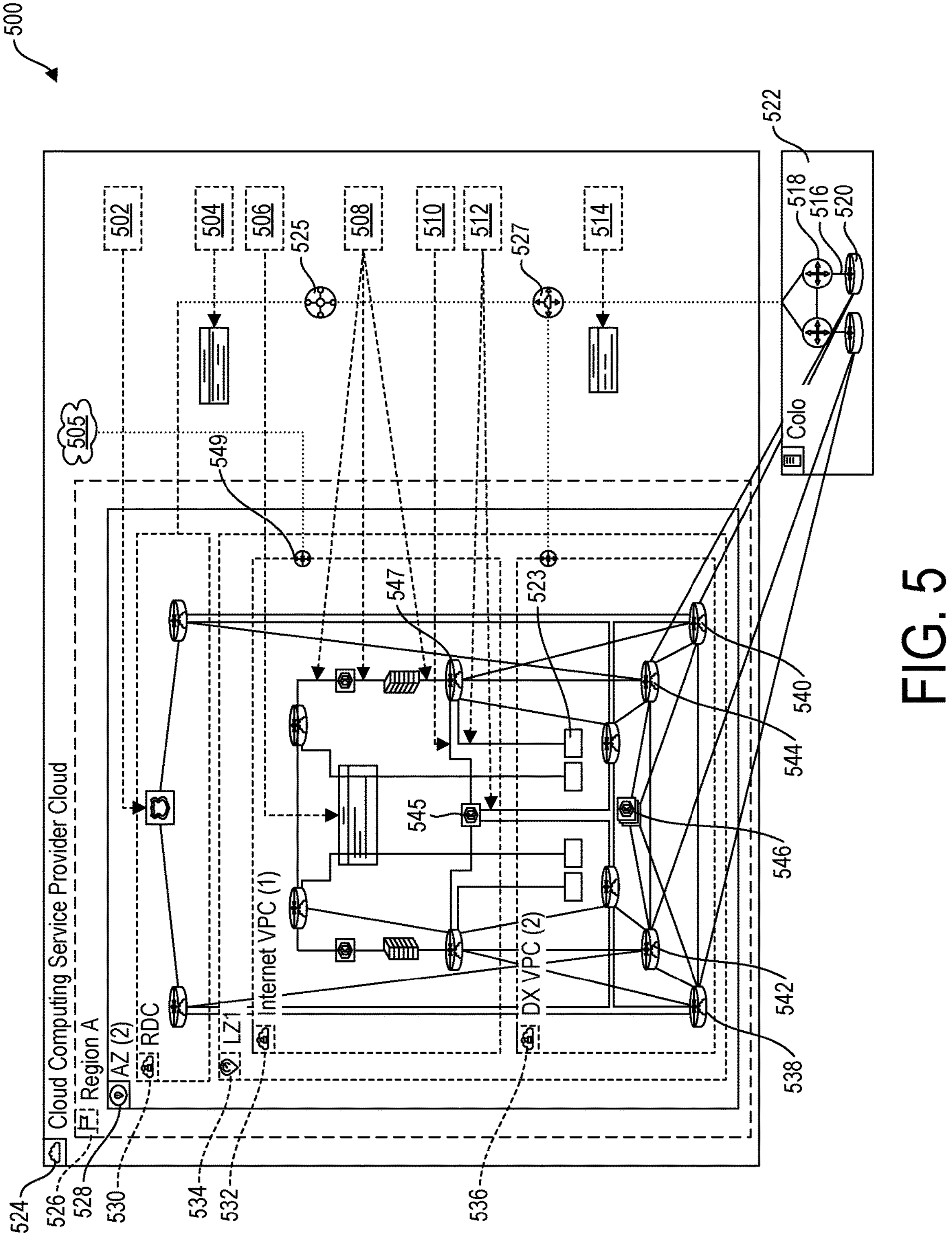
FIG. 5 illustrates a diagram of networking underlay with a Breakout Edge Data Center in a system that enables an overlay network to interconnect a first public cloud and second public cloud.

FIG. 5 is a diagram showing connectivity between certain telecommunication network components 500. Shown is a colocation data center (colo) 522 in which servers and other network equipment of different companies are physically co-located in the same physical facility. P-EDC routers 520, which are located in colo 522, receive and aggregate telecommunication data from a plurality of cellular telecommunication radio base stations and associated DUs, such as those of cell site 216 (FIG. 2) and DU 108 (FIG. 1), of a mobile network operator, such as a 5G NR cellular telecommunication network of a telecommunication service provider.

One or more P-EDC routers 520 may transmit the telecommunication data to one or more physical routers (direct connect routers 518) of a breakout edge data center (B-EDC) of a cloud computing service provider cloud 524. In the example of FIG. 5, the transmission of such telecommunication data is made via connections including a fiber optic cable 516 directly connecting one of the P-EDC routers 520 to a corresponding one of the direct connect routers 518 of the B-EDC.

The B-EDC hosts a 5G NR CU for the telecommunication service provider, disaggregated into CU-UP/CU-CP 546 corresponding to one or more of the DUs represented by DU 108 of FIG. 1. In the present example, one or more virtual routers (vRouters) of direct connect virtual private cloud (VPC) 536 provided by cloud computing service provider cloud 524 may be logically connected to and/or otherwise correspond to P-EDC routers 520. For example, vRouter 538, vRouter 540, vRouter 542, and vRouter 544 may be logically connected to corresponding ones of to P-EDC routers 520 as shown in FIG. 5.

The B-EDC is implemented within local zone 534 of cloud computing service provider cloud 524. A local zone of a cloud computing service provider is a type of infrastructure deployment that places compute, storage, database, and other select cloud computing service provider services close to large population and industry centers. In the present example, the local zone 534 may be selected based on its geographic proximity to particular cellular sites (e.g., a cellular site serving base stations) and/or a group of mobile network operator cellular telephone users or cellular telephone or Internet of Things (IoT) devices (referred to as user equipment devices (UEs)).

In an example embodiment, the telecommunication network components 500 route, at the local zone 534, using the VPC 536, at least some of the telecommunication data via Generic Routing Encapsulation (GRE) tunneling via GRE subnet 523 to an Internet VPC 532 that provides connectivity to the Internet 505 and is hosted by the B-EDC at the local zone 534. The telecommunication network components 500 also route, at the local zone 534, using the direct connect VPC 536, at least some of the telecommunication data via GRE tunneling to a regional data center (RDC) 530 of the cloud computing service provider cloud 524. The RDC 530 may be separated geographically from the BEDC.

In an example embodiment, local gateway (LGW) route table 514 is implemented for routing to transit gateway (TGW) 525 (to reach RDC 530) via a direct connect gateway (DXG) 527. Connections 512 may be cloud provider network interface attachments (e.g., AWS Elastic Network Interface (ENI) or x-ENI connections) from direct connect VPC 536 for GRE tunneling, 5G N2 interface functionality (which connects the gNodeB to the Access and Mobility Management Function, or AMF), 5G N3 interface functionality (which connects the gNodeB (RAN) to the 5G User Plane Function (UPF) 545), operations, administration and maintenance (OAM), signaling, etc. The UPF 545 advertises the Internet Protocol (IP) pool to virtual routers (e.g., vRouter 547) over the 5G N6 interface (public IP address) via connection 510. Also shown are static routes 508 and ENI based routing 506 to route traffic to the 5G N6 interface on virtual routers (vRouters). Ingress routing 504 is enabled to route the assigned Public IP traffic to the LGW 549. The domain name service (DNS) resolver 502 may be provisioned in the RDC 530 and is attached to an 5G N6 interface, but may be replaced with an on-premises or cloud-native DNS and IP address management (IPAM) service platform (e.g., such as that from Infoblox®) in the BEDC.

In some embodiments of the network architecture, the VPC enables the launch of CNF resources on a virtual network. This virtual network is intended to closely resemble an on-premises network, but also contains all the resources needed for Data Center functions. In one or more embodiment, the VPCs hosting each of the DCs are interconnected utilizing global network and Transit Gateway. In another aspect, the Transit Gateway is used in Regions to provide connectivity between VPCs deployed in the NDCs, RDCs, and BEDCs with scalability and resilience.

In one aspect of some embodiments, the Direct Connect location provides connectivity from RAN DUs (on-prem) to Local Zones where cell sites are homed. Cell sites are mapped to a particular Local Zone based on proximity to meet 5G RAN mid-haul latency expected between DU and CU.

In some embodiments, each Region hosts one NDC and three RDCs. The NDC functions communicate to each other through the Transit Gateway, where each VPC has an attachment to the specific regional Transit Gateway. EC2 and native networking is referred to as "Underlay Network" in this network architecture. Provisioning of Transit Gateway and required attachments are automated using CI/CD pipelines with cloud provider APIs. Transit Gateway routing tables are utilized to maintain isolation of traffic between functions.

In another aspect of some embodiments, some of the 5G core network functions require support for advanced routing capabilities inside VPC and across VPCs (e.g., UPF, SMF and Evolved Packet Data Gateway (ePDG)). These functions reply to routing protocols such as BGP for route exchange and fast failover (both stateful and stateless). To support these requirements, virtual routers are deployed on EC2 to provide connectivity within and across VPCs, as well as back to the on-prem network.

In some embodiments of telco-grade networks, resiliency drives the design configuration. Redundancy and resiliency are addressed at various layers of the 5G stack. Transport availability in failure scenarios is also discussed herein. High availability and geo-redundancy are NF dependent, while some NFs are required to maintain state.

In another aspect of some embodiments of NDCs, high availability and geo-redundancy are required. High availability is achieved by deploying two redundant NFs in two separate availability zones (AZs) 528 within a single VPC. The two separate availability zones 528 are implemented within Region A 526 of cloud computing service provider cloud 524. Failover within an AZ 528 can be recovered within the region without the need to route traffic to other regions. The in-region networking uses the underlay and overlay constructs, which enable on-prem traffic to seamlessly flow to the standby NF in the secondary AZ 528 if the active NF becomes unavailable.

Geo-Redundancy is achieved by deploying two redundant NFs in two separate availability zones in more than one region. This is achieved by interconnecting all VPCs via inter-region Transit Gateway and leveraging v-router for overlay networking. The overlay network is built as a full-mesh enabling service continuity using the NFs deployed across NDCs in other regions (e.g., Markets, BEDCs, RDCs, in Region A can continue to function using the NOC in Region B).

In some embodiments of RDCs, high availability and geo-redundancy are achieved by NFs failover between VPCs (multiple Availability zones) within one region. These RDCs are interconnected via Transit Gateway with the virtual router based overlay network. This provides on-premise and B-EDC reachability to the NFs deployed in each RDC with route policies in place to ensure traffic only flows to the backup RDCs, if the primary RDC becomes unreachable.

In another aspect of some embodiments of PEDCs, a RAN network is connected, through PEDC, to two different direct connect locations for reachability into the region and local zone This allows for DU traffic to be rerouted from an active BEDC to backup BEDC in the event a local zone fails.

In one or more embodiments, the network architecture uses 5G components for services in multiple target environments with full automation. In another aspect of some embodiments, the network architecture uses native automation constructs instead of building overlay automation. In still another aspect of some embodiments, the network architecture uses a mix of cloud native AP Is and existing telecom protocols.

Figure 6:
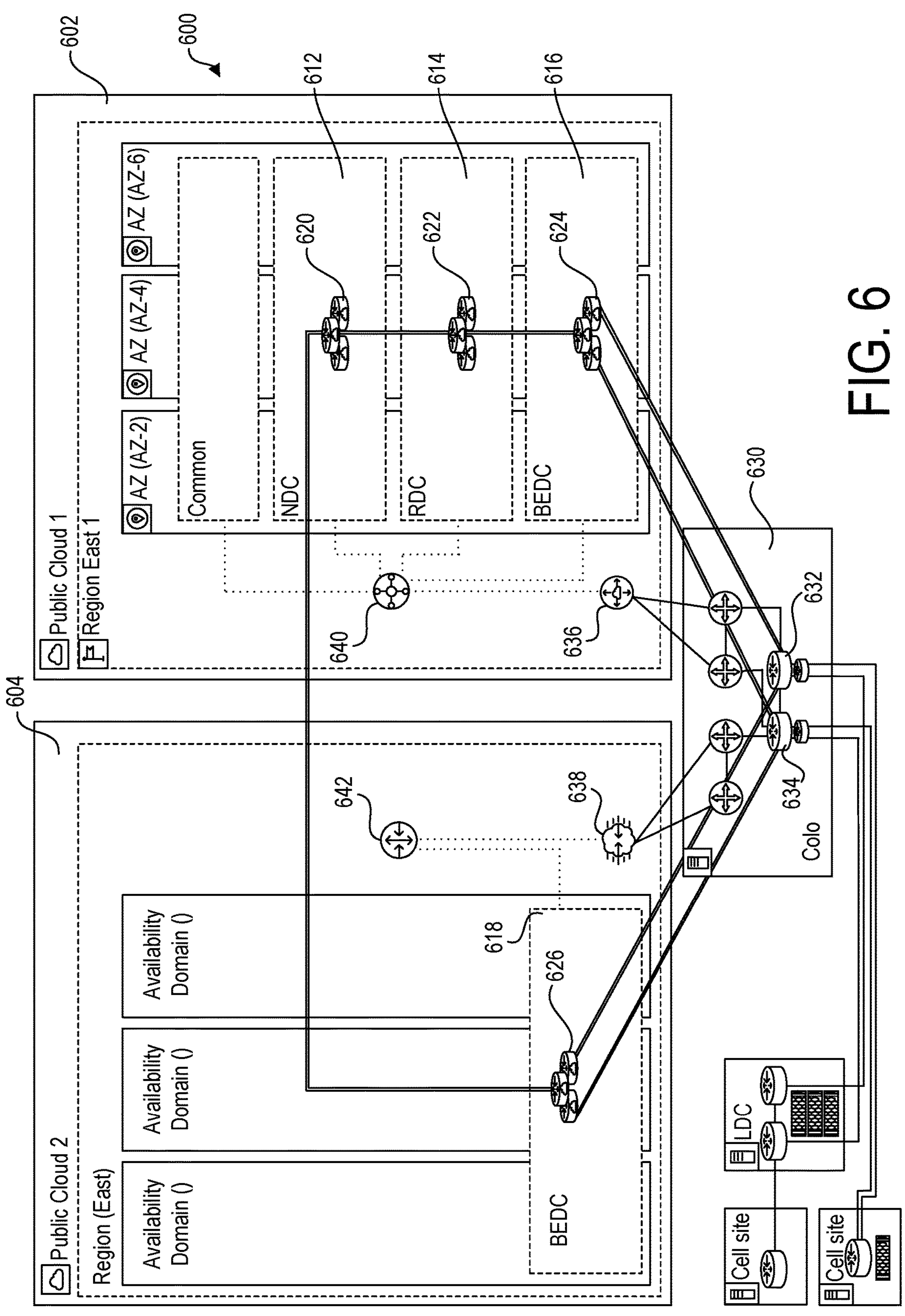
FIG. 6 illustrates a diagram of a 5G cloud computing network architecture in a system that enables a distributed network stack using an overlay network to interconnect a first public cloud and second public cloud.

FIG. 6 illustrates a diagram of a 5G cloud computing network architecture 600 in a system that enables a distributed network stack using an overlay network to interconnect a first public cloud 602 and second public cloud 604. As shown in the example of FIG. 6, the first public cloud 602 may be used to implement an NDC 612, RDC 614, and BEDC 616 as described elsewhere herein, for example with reference to FIGS. 4 and 5. In some embodiments, it may be advantageous to host some network components in a second public cloud 604, for example to decrease latency and improve performance for workloads hosted in the second public cloud 604. As shown in the example of FIG. 6, one or more BEDCs 618 may be implemented in the second public cloud 604 and connect to the RDC 614, NDC 612, and other network components in the first public cloud 602 using the overlay network of virtual routers 620, 622, 624, and 626 which are logically connected to and/or otherwise in communication with P-EDC routers 632 and 634 of colo 630. Also shown in the 5G cloud computing network architecture 600 are cloud gateways, such as DXGW 636 and FC-Edge gateway 638, and cloud provider virtual routers, such as TGW 426640 and Dynamic Routing Gateway (DRG) 642. The BEDC 618 may host cloud native functions, for example a 5G NR CU, which enables low latency workloads that enterprise customers and 5G end-users use to leverage 5G speeds. As described elsewhere herein, BEDCs 618 and 624 may span multiple operating regions of each public cloud provider, for example Availability Zones or Availability Domains as shown in the example of FIG. 6, for high availability.

By using the overlay network to connect with the BEDC 618 in the second public cloud 604, the RDC 614, NDC 612, and other network components in the first public cloud 602 may be used and do not need to be deployed in the second public cloud 604. Advantageously, this reduces the time to deploy network components in a new public cloud environment since a full stack does not need to be developed and deployed for the new environment.

Figure 7:
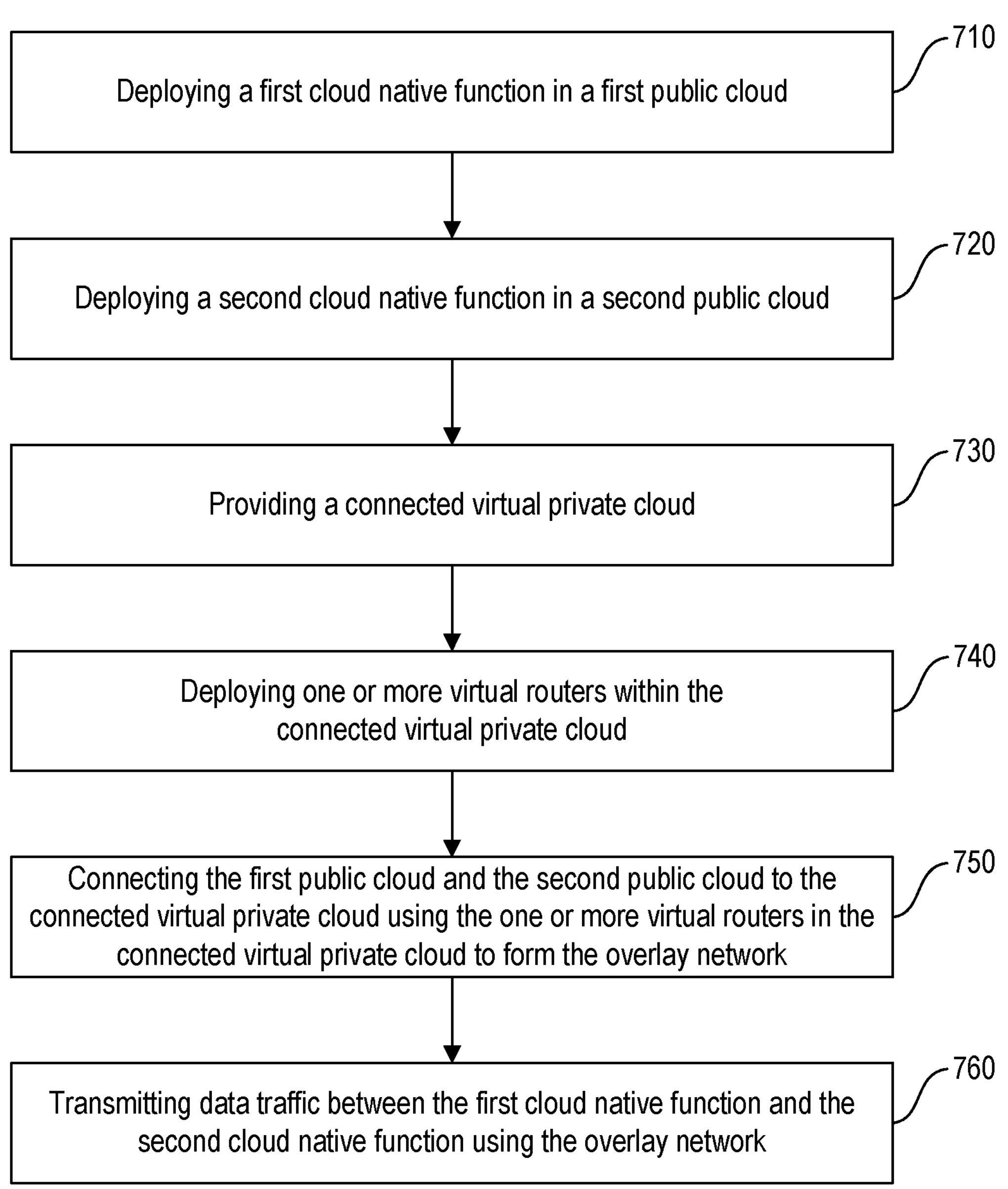
FIG. 7 illustrates a logic diagram showing an example method for distributing a network stack between a first public cloud and second public cloud using an overlay network.

FIG. 7 is a logic flow diagram showing an example method for distributing a network stack between a first public cloud and second public cloud using an overlay network. At operation 710, a first cloud native function is deployed in a first public cloud. At operation 720, a second cloud native function is deployed in a second public cloud. At operation 730, a connected virtual private cloud is provided. At operation 740, one or more virtual routers are deployed within the connected virtual private cloud. At operation 750, the first public cloud and the second public cloud are connected using the one or more virtual routers in the connected virtual cloud to form the overlay network. At operation 760, data traffic is transmitted between the first cloud native function and the second cloud native function using the overlay network.

In an example embodiment, the overlay network is connected to physical infrastructure of the first public cloud and the second public cloud via a colocation data center.

In an example embodiment, the first public cloud and the second public cloud are operated by different cloud computing cloud service providers.

In some example embodiments, a third cloud native function is deployed in an on-prem environment, the on-prem environment is connected to the first public cloud and the second public cloud via the overlay network, and data traffic is transmitted between the first cloud native function, the second cloud native function, and the third cloud native function using the overlay network.

In an example embodiment, the first cloud native function and the second cloud native function form part of a single network stack that is distributed between the first public cloud and the second public cloud.

In some aspects of the example embodiments, the overlay network causes the first public cloud and the second public cloud to appear to be on a single network due to the connections with the overlay network.

In an example embodiment, the first cloud native function is deployed to the first public cloud based on performance characteristics of the first public cloud relative to the first cloud native function.

Figure 8:
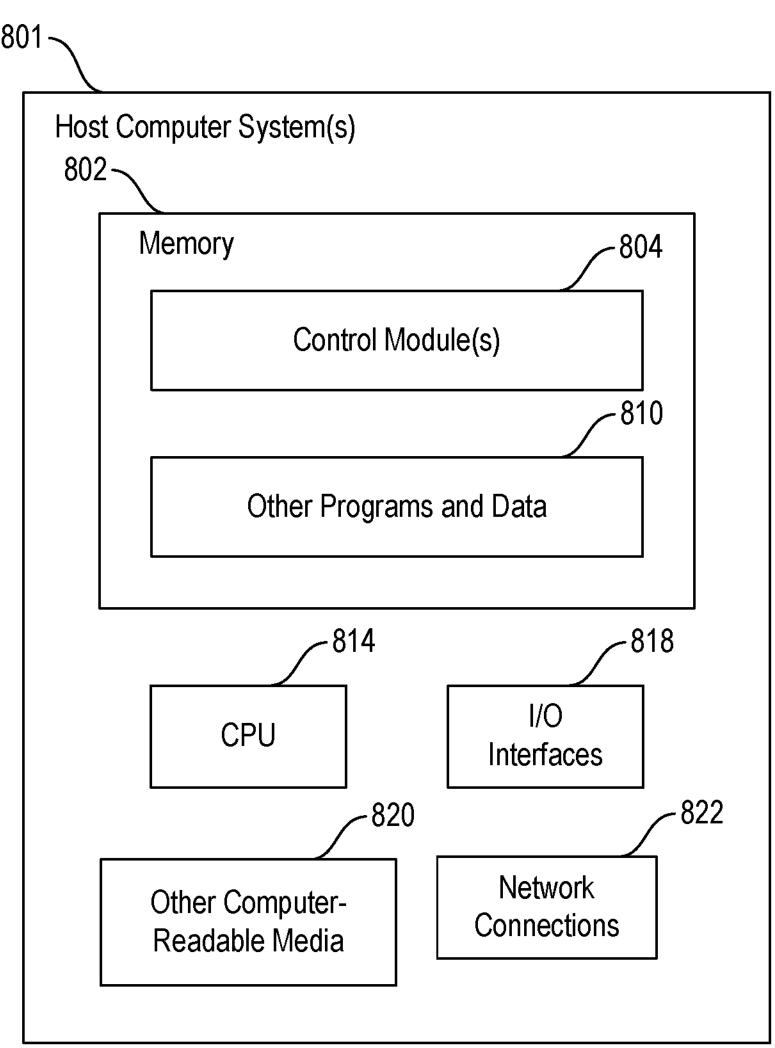
FIG. 8 shows a system diagram that describes an example implementation of a computing system(s) for implementing embodiments described herein.

FIG. 8 shows a system diagram that describes an example implementation of a computing system(s) for implementing embodiments described herein.

In particular, shown is example host computer system(s) 801. For example, such computer system(s) 801 may represent one or more of those in various data centers, base stations and cell sites shown and/or described herein that are, or that host or implement the functions of the systems described herein. For example, this may include, but is not limited to, one or more of: routers, components, microservices, nodes, node groups, control planes, clusters, virtual machines, NFs, and other aspects described herein for implementing a distributed network stack using an overlay network. In some embodiments, one or more special-purpose computing systems may be used to implement the functionality described herein. Accordingly, various embodiments described herein may be implemented in software, hardware, firmware, or in some combination thereof. Host computer system(s) 801 may include memory 802, one or more central processing units (CPUs) 914, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems, components and modules described herein for implementing a distributed network stack using an overlay network. Memory 802 may also store other programs and data 810, which may include rules, databases, application programming interfaces (APIs), software containers, nodes, pods, clusters, node groups, control planes, software defined data centers (SDDCs), microservices, virtualized environments, virtual routers, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interfaces, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for deploying network functions into target cloud computing environments in a cellular telecommunication network using an overlay network, the method comprising:

deploying, by a mobile network operator, a first cloud native function in a first public cloud;

deploying, by the mobile network operator, a second cloud native function in a second public cloud;

providing a connected virtual private cloud;

deploying one or more virtual routers within the connected virtual private cloud;

connecting the first public cloud and the second public cloud to the connected virtual private cloud using the one or more virtual routers in the connected virtual private cloud to form the overlay network; and transmitting data traffic between the first cloud native function and the second cloud native function using the overlay network;

wherein network components hosted in the first public cloud support the second cloud native function that is deployed in the second public cloud via the overlay network such that a time is reduced to deploy additional network components in the second public cloud by bypassing a full stack deployment in the second public cloud.

2. The method of claim 1, wherein the overlay network is connected to physical infrastructure of the first public cloud and the second public cloud via a colocation data center.

3. The method of claim 1, wherein the first public cloud and the second public cloud are operated by different cloud computing cloud service providers.

4. The method of claim 1, further comprising:

deploying a third cloud native function in an on-premises environment;

connecting the n-premises environment to the first public cloud and the second public cloud via the overlay network; and transmitting data traffic between the first cloud native function, the second cloud native function, and the third cloud native function using the overlay network.

5. The method of claim 1, wherein the first cloud native function and the second cloud native function form part of a single network stack that is distributed between the first public cloud and the second public cloud.

6. The method of claim 1, further comprising causing the first public cloud and the second public cloud to appear to be on a single network due to connections with the overlay network.

7. The method of claim 1, wherein the first cloud native function is deployed to the first public cloud based on performance characteristics of the first public cloud relative to the first cloud native function.

8. A system for deploying network functions into target cloud computing environments in a cellular telecommunication network using an overlay network, the system comprising:

at least one memory that stores computer executable instructions; and at least one processor that executes the computer executable instructions to cause actions to be performed, the actions including:

deploying, by a mobile network operator, a first cloud native function in a first public cloud;

deploying, by the mobile network operator, a second cloud native function in a second public cloud;

providing a connected virtual private cloud;

deploying one or more virtual routers within the connected virtual private cloud;

connecting the first public cloud and the second public cloud to the connected virtual private cloud using the one or more virtual routers in the connected virtual private cloud to form the overlay network; and transmitting data traffic between the first cloud native function and the second cloud native function using the overlay network;

wherein network components hosted in the first public cloud support the second cloud native function that is deployed in the second public cloud via the overlay network such that a time is reduced to deploy additional network components in the second public cloud by bypassing a full stack deployment in the second public cloud.

9. The system of claim 8, wherein the overlay network is connected to physical infrastructure of the first public cloud and the second public cloud via a colocation data center.

10. The system of claim 8, wherein the first public cloud and the second public cloud are operated by different cloud computing cloud service providers.

11. The system of claim 8, wherein the actions further include:

deploying a third cloud native function in an on-premises environment;

connecting the on-premises environment to the first public cloud and the second public cloud via the overlay network; and transmitting data traffic between the first cloud native function, the second cloud native function, and the third cloud native function using the overlay network.

12. The system of claim 8, wherein the first cloud native function and the second cloud native function form part of a single network stack that is distributed between the first public cloud and the second public cloud.

13. The system of claim 8, wherein the first public cloud and the second public cloud appear to be on a single network due to connections with the overlay network.

14. The system of claim 8, wherein the first cloud native function is deployed to the first public cloud based on performance characteristics of the first public cloud relative to the first cloud native function.

15. A non-transitory computer-readable storage medium having computer-executable instructions stored thereon that, when executed by at least one processor, cause the at least one processor to cause actions to be performed, the actions including:

deploying, by a mobile network operator, a first cloud native function in a first public cloud;

deploying, by the mobile network operator, a second cloud native function in a second public cloud;

providing a connected virtual private cloud;

deploying one or more virtual routers within the connected virtual private cloud;

connecting the first public cloud and the second public cloud to the connected virtual private cloud using the one or more virtual routers in the connected virtual private cloud to form an overlay network; and transmitting data traffic between the first cloud native function and the second cloud native function using the overlay network;

wherein network components hosted in the first public cloud support the second cloud native function that is deployed in the second public cloud via the overlay network such that a time is reduced to deploy additional network components in the second public cloud by bypassing a full stack deployment in the second public cloud.

16. The non-transitory computer-readable storage medium of claim 15, wherein the overlay network is connected to physical infrastructure of the first public cloud and the second public cloud via a colocation data center.

17. The non-transitory computer-readable storage medium of claim 15, wherein the first public cloud and the second public cloud are operated by different cloud computing cloud service providers.

18. The non-transitory computer-readable storage medium of claim 15, wherein the actions further include:

deploying a third cloud native function in an on-premises environment;

connecting the on-premises environment to the first public cloud and the second public cloud via the overlay network; and transmitting data traffic between the first cloud native function, the second cloud native function, and the third cloud native function using the overlay network.

19. The non-transitory computer-readable storage medium of claim 15, wherein the first cloud native function and the second cloud native function form part of a single network stack that is distributed between the first public cloud and the second public cloud.

20. The non-transitory computer-readable storage medium of claim 15, wherein the first public cloud and the second public cloud appear to be on a single network due to connections with the overlay network.

* * * * *